Sept. 16, 1958        H. ST. PIERRE        2,852,057
REINFORCING LUGS FOR TIRE CHAINS
Filed Aug. 22, 1955
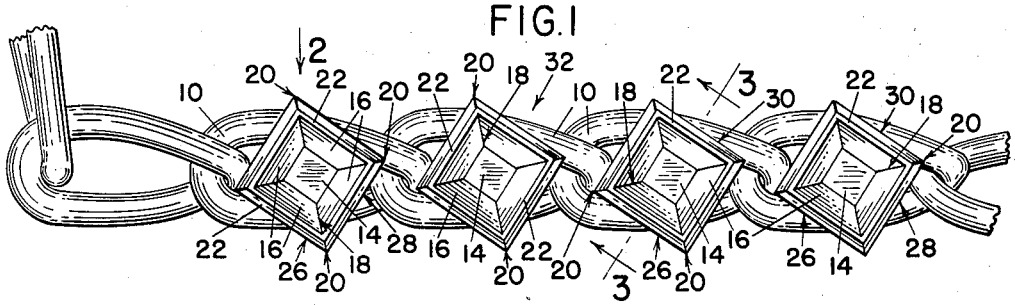
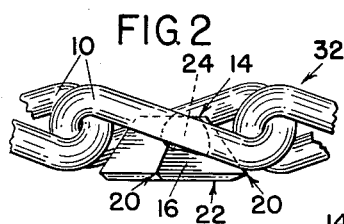
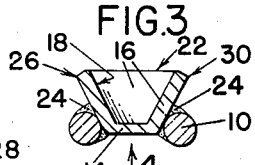
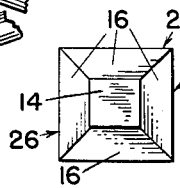
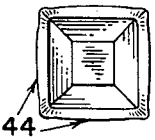
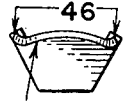
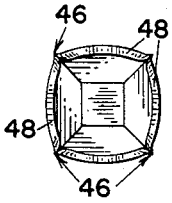
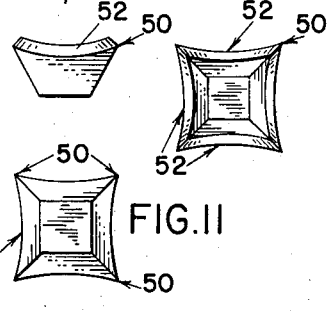
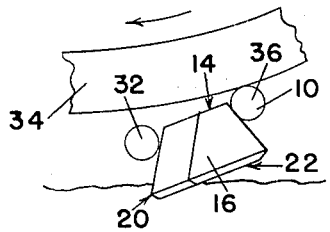
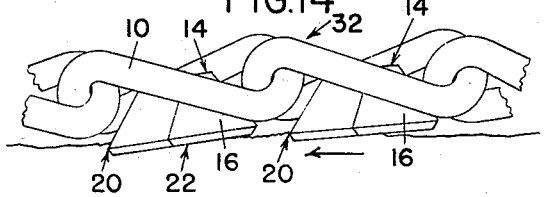
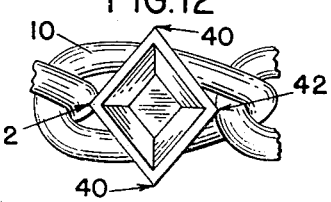
INVENTOR
HENRY ST. PIERRE
ATTORNEY United States Patent Office 2,852,057
Patented Sept. 16, 1958

2,852,057

REINFORCING LUGS FOR TIRE CHAINS

Henry St. Pierre, Worcester, Mass.

Application August 22, 1955, Serial No. 529,763

5 Claims. (Cl. 152—245)

This invention relates to a new and improved tire chain for vehicles for increasing traction under conditions of mud, ice, snow, etc. The principal object of the present invention resides in the provision of reinforcing means for the twisted link cross chains of a tire chain wherein each reinforcement or lug comprises a flat-sided cup-like member having a flat rectangular or square bottom which is small enough to fit in between the side runs of a twisted cross chain link, and continuous flat-sided side walls flaring out from the bottom beyond the chain, said flat walls being in rectangular or square shape and terminating in an open co-planar continuous ground-engaging edge to the end that all portions of the ground-engaging edge shall hit the ground simultaneously, whereby damage to a pavement is greatly reduced and so that the reinforcements will wear down evenly and will not change shape to any great extent except to gradually lessen in size as the wear increases; and also to provide for smoother running reinforced chains avoiding the use of ground-engaging points and the like which tend to damage the pavement and also wear down quickly and increase the noise and jolting of the reinforced tire chain, to the end that a smoother acting, less noisy and longer-lasting chain may result.

Other objects of the invention include the provision of a square or diamond-shaped reinforcement for tire chains as described above, the reinforcements each having flat side walls fitting the inside aspects of the side runs of the usual twisted link cross chain flatly for disposition of each reinforcing lug relatively inclined with respect to the cross chain, and presenting four points one of which is pointed generally forwardly of the direction of travel of the vehicle, one being pointed generally rearwardly, and the other two points being directed in opposite directions transversely of the vehicle, to the end that side-slip is largely eliminated and also the forward and rearwardly directed points provide for digging into the ground when the cross chains tend to rotate on their axes slightly as always happens in heavy going or where the chain is even slightly loose on the tread of the tire.

Other objects and advantages of the invention will appear hereinafter.

Reference is to be made to the accompanying drawings, in which:

Fig. 1 is a plan view showing a cross chain according to the present invention;

Fig. 2 is a side view, looking in the direction of arrow 2 in Fig. 1;

Fig. 3 is a section on line 3—3 of Fig. 1;

Fig. 4 is a bottom plan view, looking in the direction of arrow 4 in Fig. 1 and omitting the link;

Fig. 5 is a side view of a slightly modified form of reinforcing lug;

Fig. 6 is a plan view thereof, looking in the direction of arrow 6 in Fig. 5;

Fig. 7 is a side view of a modification;

Fig. 8 is a plan view, looking in the direction of arrow 8 in Fig. 7;

Fig. 9 is a side view of a further modification;

Fig. 10 is a plan view, looking in the direction of arrow 10 in Fig. 9;

Fig. 11 is a bottom plan view thereof;

Fig. 12 shows a modification; and

Figs. 13 and 14 illustrate diagrammatically the action of the new reinforcing chain from two different aspects thereof.

Referring now to Figs. 1, 2, 3 and 4, there is provided a cross chain for a tire chain which is made up of twisted links 10 which are connected at their ends to the usual side wall chain. Each twisted link has a pair of side runs best seen in Fig. 2, and the reinforcing lugs which form the subject matter of the present invention are located at least partly in between the runs of these links.

Each lug is preferably square in nature and is provided with a flat square bottom floor or web member 14 from each side of which there rises a flat-sided, outwardly-flaring wall 16. The walls 16 are all continuous and connected at right angles with respect to each other, forming corners 18, and these corners form points 20. These points 20 do not extend out from the walls 16. The free edges 22 of the walls 16 are all co-planar and do not present raised points, the points 20 all being in the same plane as is perhaps best seen in Fig. 12.

Two opposite side walls 16 are positioned between the side runs of the links 10 with the flat exterior sides of the walls contacting the maximum surface of these side runs, and in this position, the square lugs are welded to the twisted links and this provides a much improved securement between the lugs and the links due to the increased contacting area generally indicated at 24 in Fig. 2.

With the square reinforcing members thus positioned, the same present forward and rearward plow-like points with relation to the travel of the vehicle, i. e. laterally of the cross chain as a chain, and two other points extending longitudinally of the chain or pointing laterally of the path of the vehicle. It will also be seen that the opposite lug corners are not exactly in line with each other, so that the edge which is indicated at 26 faces forwardly to a slightly greater degree than the edge 28; while edge 28 presents a greater portion to the general longitudinal axis of the chain than does the side edge 30 which is opposite to that at 26, and presents a longer effective edge to the direction of the vehicle.

The relative position of the respective points 20 as above described depends upon the fact that the reinforcing lugs are square exteriorly and that the links are conventional twist links.

The operation of these reinforcements under actual conditions is represented in Figs. 13 and 14. Fig. 13 provides observation of the rear wheel of a vehicle to which the chain is applied looking in the direction of the axle and with the wheel turning in the direction of the arrow in Fig. 13. The cross chain and thus its lugs tend to tilt as shown, with the side of the cross chain indicated at 32 starting to leave the surface of the tire 34 and in general pivoting about the side run of the link 10 indicated at 36 as an axis. This causes the point 20 to dig into the ground, or extend outwardly, to a much greater degree than would otherwise be the case. The same relative action occurs if the vehicle should side-slip, the points of the respective reinforcing lugs tending to dig into the ground as shown in Fig. 14 when the side-slip is in the direction of the arrow in Fig. 14.

Under conditions of use of the chain where there is no slip or skid, the digging in effect of points 20 will not be present and the chains will bear directly flatly and evenly on a bare pavement, so that all points of the square edges 22 will wear down evenly as there is no more pressure on any one than on another, and the noise and damage to the pavement is reduced. Hence the square shape of the cups is maintained and whereas if the edges were made sharp or pointed, the sharp edges or points would quickly wear off, thus changing the shape of the worn reinforcement from that originally had, and also since all of the edges 22 of all of the cups in a single cross chain hit the ground at the same time, the effect will be less noisy and bumpy than would be the case were there definite points sticking up from the edges or corners of the cups.

The Fig. 12 diamond-shaped cup lug may be used with the points arranged in either direction, but in general it is preferred to arrange the long points 40 at the rear and forward as to vehicle direction and the shorter points 42 laterally. This gives greater digging in in Fig. 13, but less in Fig. 14. However, there are usually more lugs working in side slip, so the traction effect is not widely different. There may be other modifications of the basic idea as in Figs. 5 and 6 where an edge 44 is seen to be slightly curved due to the use of a square blank to stamp the lug. Otherwise the Figs. 5 and 6 showing is the same as that of Fig. 1.

In Figs. 7 and 8, very slight upward points 46 are formed joined by upward curves 48, and this again depends on the blank from which the lug is stamped. The points 46 will soon wear off but the undulating contour gives a greater traction. In this case also the side walls and bottom are flat as in Figs. 1 and 5 and 6.

Figs. 9, 10 and 11 show a flat sided cup wherein the walls and bottom are all flat as before but here these formed points 50 are joined by inward curves 52. Except for the points, the cup is the same as in Fig. 1.

Having thus described my invention and the advantages thereof, I do not wish to be limited to the details herein disclosed, otherwise than as set forth in the claims, but what I claim is:

1. A reinforced cross chain for a tire chain comprising a length of twisted link chain for securement at the ends thereof to side wall chains of a tire chain and a separate reinforcing and traction element on certain of the twisted links, each said element comprising a square cup having flat inner and outer side walls and a flat square bottom, the bottom and side walls all being integral and connected and the side walls diverging from the bottom and terminating in an open square having rectilinear connected co-planar edges.

2. The cross chain of claim 1 wherein the open square formed by the cup edges is substantially larger than the square cup bottom.

3. The cross chain of claim 1 wherein the open square formed by the cup edges is substantially larger than the square cup bottom and each edge of the square bottom is equi-distant from an edge of the open square.

4. The cross chain of claim 1 wherein opposite side walls of each cup flatly abut the inside aspects of the side runs of its respective twisted link.

5. Reinforced cross chain for tire chain comprising a length of twisted link chain for securement at the ends thereof to the side wall chains of the tire chain and a separate reinforcing and traction element on certain of the twisted links, each said element comprising a square cup having a square bottom and flaring flat side walls terminating in an open square, said flat walls having edges meeting at right angle corners forming four points, each cup being secured to a twisted link with a flat side thereof contacting a run of a twisted link and two of said points facing in opposite directions generally along the twisted link chain and laterally thereof, so that one point faces forwardly and one rearwardly with respect to the direction of motion of a vehicle to the tire of which the chain is attached, one point facing each side of the tire laterally, the exposed free edges of the cup being co-planar so that all portions thereof strike the ground simultaneously and the cup wears down without appreciable change in contour of the edges.

References Cited in the file of this patent

UNITED STATES PATENTS

| | | |
|---|---|---|
| 1,880,170 | Biffar | Sept. 27, 1932 |
| 2,538,046 | St. Pierre | Jan. 16, 1951 |
| 2,601,883 | St. Pierre | July 1, 1952 |